US011950045B2

(12) United States Patent
Shao et al.

(10) Patent No.: US 11,950,045 B2
(45) Date of Patent: Apr. 2, 2024

(54) SOUNDING DEVICE

(71) Applicant: AAC Microtech (Changzhou) Co., Ltd., Changzhou (CN)

(72) Inventors: Tao Shao, Shenzhen (CN); Xudong Yan, Shenzhen (CN); Xiaojiang Gu, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 165 days.

(21) Appl. No.: 17/833,743

(22) Filed: Jun. 6, 2022

(65) Prior Publication Data

US 2023/0199371 A1 Jun. 22, 2023

(30) Foreign Application Priority Data

Dec. 21, 2021 (CN) ........................ 202111571517.2

(51) Int. Cl.
*G10K 11/16* (2006.01)
*H04R 1/28* (2006.01)
*H04R 9/04* (2006.01)
*H04R 9/06* (2006.01)

(52) U.S. Cl.
CPC ........... *H04R 1/2811* (2013.01); *H04R 9/043* (2013.01); *H04R 9/06* (2013.01); *H04R 2400/11* (2013.01)

(58) Field of Classification Search
CPC ........ H04R 1/2811; H04R 9/043; H04R 9/06; H04R 2400/11
USPC ................................................ 381/71.1, 71.7
See application file for complete search history.

(56) References Cited

FOREIGN PATENT DOCUMENTS

WO WO-2022061982 A1 * 3/2022

* cited by examiner

*Primary Examiner* — Ammar T Hamid
(74) *Attorney, Agent, or Firm* — W&G Law Group

(57) ABSTRACT

The present application provides a sounding device. The sounding device includes a front surface with a sound outlet hole; a back surface; a sounding component and an outer casing. The outer casing is covered outside the sounding component. A cavity is formed between the outer casing and the end of the sounding component close to the back side. A sound guiding channel is arranged in the outer casing. One end of the sound guiding channel is communicated with the sound outlet hole, and the other end of the sound guiding channel is communicated with the cavity. The sounding device of the present application provides a smooth transmission channel for the sound from the back side by arranging the sound guiding channel in the outer casing, thereby strengthening the frontal sound of the sounding device and greatly improving the loudness of the sounding device.

9 Claims, 6 Drawing Sheets

SOUNDING DEVICE

TECHNICAL FIELD

The present application relates to the technical field of electroacoustic conversion, in particular to a sounding device.

BACKGROUND

As an important part of the vehicle entertainment system, the vehicle sounding device provides functions such as music playback and voice interaction. The vehicle-mounted sounding device with a conventional structure is required to be made lager to have a better performance. However, the mounting space (e.g., vehicle doors) of the vehicle-mounted sounding device is limited, which greatly limits the size of the vehicle-mounted sounding device. Therefore, it is necessary to provide a new vehicle-mounted sounding device to perform a better sound effect in a limited space.

SUMMARY

The present application provides a sounding device to solve the problems of insufficient sound loudness and insufficient low-frequency dive in the existing sounding device.

The present application provides a sounding device, comprising:

a front side with a sound outlet;

a back side;

a sounding component comprising a sounding module having a first diaphragm disposed at an end of the sounding module close to the front side, and a second diaphragm disposed at an end of the sounding module close to the back side;

an outer casing located outside the sounding component for forming a cavity between the outer casing and the end of the sounding component close to the back side; and a sound guiding channel formed in the outer casing, wherein one end of the sound guiding channel is communicated with the sound outlet hole, and the other end of the sound guiding channel is communicated with the cavity.

In one embodiment, the sounding device further comprises a sound guiding hole formed in the outer casing and at one end of the sounding component close to the front side, the sound guiding hole is aligned with the sound outlet hole, and an end of the sound guiding channel facing away from the cavity is communicated with the sound guiding hole.

In one embodiment, the outer casing comprises:

a side casing forming the sound guiding channel along a height direction of the side casing; and a bottom cover covering on one end of the side casing close to the back side for forming the cavity among the bottom cover and the side casing and one end of the sounding component close to the back side.

In one embodiment, the sound guiding channel comprises a first sound guiding channel and a second sound guiding channel;

the side casing comprises:

a first side casing, one end of which close to the front side is open to form the sound outlet hole, and the sound guiding hole is formed between the first side casing and the sounding component; the first side casing is provided with a first sound guiding channel, and one end of the first sound guiding channel is communicated with the sound outlet hole; and a second side casing connected to the first side casing, wherein the cavity is formed among the bottom cover, the second side casing and the one end of the sounding component close to the back side; the second side casing is provided with a second sound guiding channel; one end of the second sound guiding channel is communicated with the first sound guiding channel, and the other end of the second sound guiding channel is communicated with the cavity.

In one embodiment, the first side casing is provided with a first mounting platform, which is arranged one end of the sounding component close to the front side; the first sound guiding channel is opened on the first mounting platform.

In one embodiment, a second mounting platform is provided in the second side casing, and the second mounting platform is arranged one end of the sounding component close to the back side; the second sound guiding channel is opened on the second mounting platform.

In one embodiment, a plurality of limiting platforms are provided on an inner side of the second mounting platform, and one end of the sounding component close to the back side is in contact with the plurality of limiting platform; the plurality of the limiting platforms are arranged at intervals along a circumference of the second mounting platform; there is a gap between every two adjacent limiting platforms, and the gap is aligned with the second sound guiding channel.

In one embodiment, a mounting plate is provided on an outer periphery of the second side casing, and a third mounting hole is opened on the mounting plate.

In one embodiment, wherein the sounding component further comprises:

a mounting bracket connected to the outer casing, wherein a sound guiding hole is formed on the outer casing and at an end of the mounting bracket close to the front side, and the sounding module is arranged in the mounting bracket.

The present application has the following beneficial effects.

The sounding device of the present application includes a sounding component and an outer casing. The sounding component includes a double-sided sounding module, and the outer casing is covered outside the sounding component, thereby protecting the sounding component, and achieving that the sounding component emits sound from the front side of the sounding device through a shielding effect of the outer casing. A cavity is formed between the outer casing and an end of the sounding component close to the back side. A sound guiding channel is arranged in the outer casing, in which one end of the sound guiding channel is communicated with the sound outlet hole, and the other end thereof is communicated with the cavity. By arranging the sound guiding channel in the outer casing, a smooth transmission channel is provided for the sound behind the sounding device, so that the sound emitted by the sounding component on the back side of the sounding device passes through the cavity and the sound guiding channel in turn, and leads out from the sound outlet hole on the front side of the sounding device, thereby strengthening the frontal sound of the sounding device and greatly improving the loudness of the sounding device.

It should be understood that the foregoing general description and the following detailed description are exemplary only, and do not limit the present application.

REFERENCE NUMBERS

Figure 1:
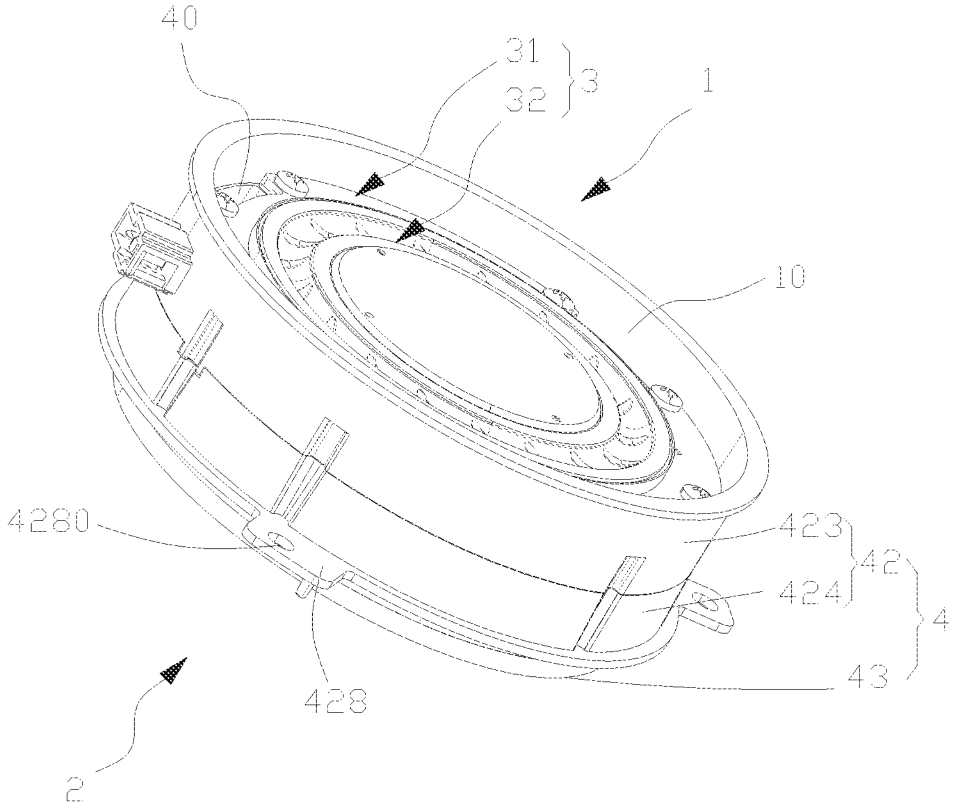
FIG. 1 is an isometric view of a sounding device according to an embodiment of the present application, from an aspect.

1—front side;
10—sound outlet hole;
2—back side;
3—sounding component;
31—mounting bracket;
32—sounding module;
321—first diaphragm;
322—second diaphragm;
4—outer casing;
40—sound guiding hole;
400—cavity;
41—sound guiding channel;
411—first sound guiding channel;
412—second sound guiding channel;
42—side casing;
423—first side casing;
424—second side casing;
425—first mounting platform;
4250—first mounting hole;
426—second mounting platform;
4260—second mounting hole;
427—limiting platform;
4270—gap;
428—mounting plate;
4280—third mounting hole;
43—bottom cover.

The accompanying drawings herein are incorporated in the specification and constitute a part of the specification, which illustrate embodiments consistent with the present application and to explain the principles of the present application with the description.

DETAILED DESCRIPTION OF THE EMBODIMENTS

In order to better understand the technical solutions of the present application, the embodiments of the present application are described in detail below with reference to the accompanying drawings.

It should be clear that the described embodiments are only a part of the embodiments of the present application, but not all of the embodiments. Based on the embodiments in the present application, all other embodiments obtained by those of ordinary skill in the art without creative efforts shall fall within the protection scope of the present application.

The terms used in the embodiments of the present application are only for the purpose of describing specific embodiments, and are not intended to limit the present application. The singular forms "a", "an" and "the" used in the embodiments of the present application and the appended claims are also intended to include the plural forms, unless the context clearly dictates otherwise.

It should be understood that the term "and/or" used in this document is only an association relationship to describe associated objects, indicating that there may be three kinds of relationships. For example, A and/or B, which may indicate three cases of A alone, A and B, and B alone. In addition, the character "/" in this document generally indicates that the related objects are an "or" relationship.

It should be noted that the directional words such as "up", "down", "left" and "right" described in the embodiments of the present application are described from the angles shown in the drawings, and should not be construed as implementing the embodiments of the present application. In this context, it should also be understood that, when it is mentioned that an element is connected to an "upper" side or a "lower" side of the other element, it may not only be directly connected to the "upper" side or the "lower" side of the other element, but also be indirectly connected to the "upper" side or the "lower" side of the other element through an intermediate element.

The embodiment of the present application provides a sounding device, which may be applied to but not limited to vehicles such as buses and cars, and may be mainly arranged on the position such as vehicle doors and in-vehicle clothes racks. The sounding device emits sound from one side and has the advantages of large loudness and good bass effect.

According to some specific embodiments of the present application, as shown in FIGS. 1-6, the sounding device has a front side 1 and a back side 2, and the front side 1 is provided with a sound outlet hole 10. The sounding device includes a sounding component 3 and an outer casing 4. The outer casing 4 is covered outside the sounding component 3. The sounding component 3 includes a sounding module 32. One end of the sounding module 32 close to the front side 1 is provided with a first diaphragm 321, and the end of the sounding module 32 close to the back side 2 is provided with a second diaphragm 322. A cavity 400 is formed between the outer casing 4 and an end of the sounding component 3 close to the back side 2. A sound guiding channel 41 is provided in the outer casing 4. One end of the sound guiding channel 41 is communicated with the sound outlet hole 10, and the other end of the sound guiding channel 41 is communicated with the cavity 400. Specifically, the outer casing 4 may be a BOX casing.

In this embodiment, the sounding device includes the sounding component 3 and the outer casing 4. The sounding component 3 is configured to emit sound, which may be a speaker. The sounding component 3 includes a sounding module 32, and the sounding module 32 is a double-sided sounding module. One end of the sounding module 32 close to the front side 1 is provided with the first diaphragm 321, and one end of the sounding module 32 close to the back side 2 is provided with the second diaphragm 322. When the sounding module 32 is working, the front side 1 of the sounding device is sounding toward passengers, and the back side of the sounding device 2 is sounding away from the passengers. The outer casing 4 is covered outside the sounding component 3, thereby protecting the sounding component 3. In addition, through a shielding effect of the outer casing 4, the sound of the back side 2 of the sounding device can be guided to the front side 1 facing the passenger, so as to achieve an effect of doubling the sound effect in a limited space. Besides, since the diaphragms are arranged on both sides of the sounding module 32, the resonances generated by themself can be canceled, thereby reducing the vibration of the fixed sheet metal of the door/shelf, and greatly improving the performance of noise, vibration and harshness. The cavity 400 is formed between the outer casing 4 and the end of the sounding component 3 close to the back side 2. The sound guiding channel 41 is provided in the outer casing 4. One end of the sound guiding channel 41 is communicated with the sound outlet hole 10, and the other end of the sound guiding channel 41 is communicated with the cavity 400. By arranging the sound guiding channel 41 in the outer casing 4, a smooth transmission channel is provided for the sound from the back side of the sounding device, so that the sound emitted by the sounding component 3 on the back side of the sounding device passes through the cavity 400 and the sound guiding channel 41 in turn, and leads out from the sound outlet hole 10 on the front side 1 of the sounding device, thereby strengthening the front sound of the sounding device and greatly improving the loudness of the sounding device.

Specifically, there may be one or more sound guiding channels 41. In some specific embodiments, there are a plurality of sound guiding channels 41, and the plurality of sound guiding channels 41 are arranged at intervals along a circumference of the outer casing 4.

According to some specific embodiments of the present application, as shown in FIG. 1, a sound guiding hole 40 is formed on the outer casing 4 and at one end of the sounding component 3 close to the front side 1, and the sound guiding hole 40 is aligned with the sound outlet hole 10. One end of the sound guiding channel 41 facing away from the cavity 400 is communicated with the sound guiding hole 40.

In this embodiment, the sound guiding hole 40 is formed on the outer casing 4 and at one end of the sounding component 3 close to the front side 1, and the sound guiding hole 40 is aligned with the sound outlet hole 10. One end of the sound guiding channel 41 facing away from the cavity 400 is communicated with the sound guiding hole 40, and the sound guiding hole 40 further guides the sound derived from the sound guiding channel 41, so that the sound emitted by the sounding component 3 on the back side of the sounding device is more accurately and effectively derived from the sound outlet hole 10. The sound emitted from the back side of the sounding component 3 passes through the cavity 400, the sound guiding channel 41 and the sound guiding hole 40 in sequence, and finally lead out from the sound outlet hole 10 on the front side 1 of the sounding device.

Specifically, the sound outlet hole 10 may be arranged according to the number of the sound guiding channels 41, which may be one or more.

According to some specific embodiments of the present application, as shown in FIG. 1, the outer casing 4 includes a side casing 42 and a bottom cover 43. The sound guiding channel 41 is provided in the side casing 42 along a height direction of the side casing 42. The bottom cover 43 is covered on one end of the side casing 42 close to the back side 2. The cavity 400 is formed among the bottom cover 43, the side casing 42 and the end of the sounding component 3 close to the back side 2.

In this embodiment, the outer casing 4 includes the side casing 42 and the bottom cover 43. The side casing 42 covers the sounding component 3 from the side to prevent the sound generated by the sounding component 3 from diffusing from the side. The bottom cover 43 is covered at the end of the side casing 42 close to the back side 2, the bottom cover 43 covers the sounding component 3 from the back side 2 of the sounding device to prevent the sound generated by the sounding component 3 from diffusing from the back side 2 of the sounding device. The cavity 400 is formed among the bottom cover 43, the side casing 42 and the end of the sounding component 3 close to the back side 2, and the sound guiding channel 41 is arranged in the side casing 42. Such a design has a compact structure, so that the sound emitted by the sounding component 3 on the back side of the sounding device firstly enters the cavity 400 formed among the bottom cover 43, the side casing 42 and the end of the sounding component 3 close to the back side 2, and then transmits through the sound guiding channel 41 in the side shell 42, and finally leads out from the sound outlet hole 10.

Figure 2:
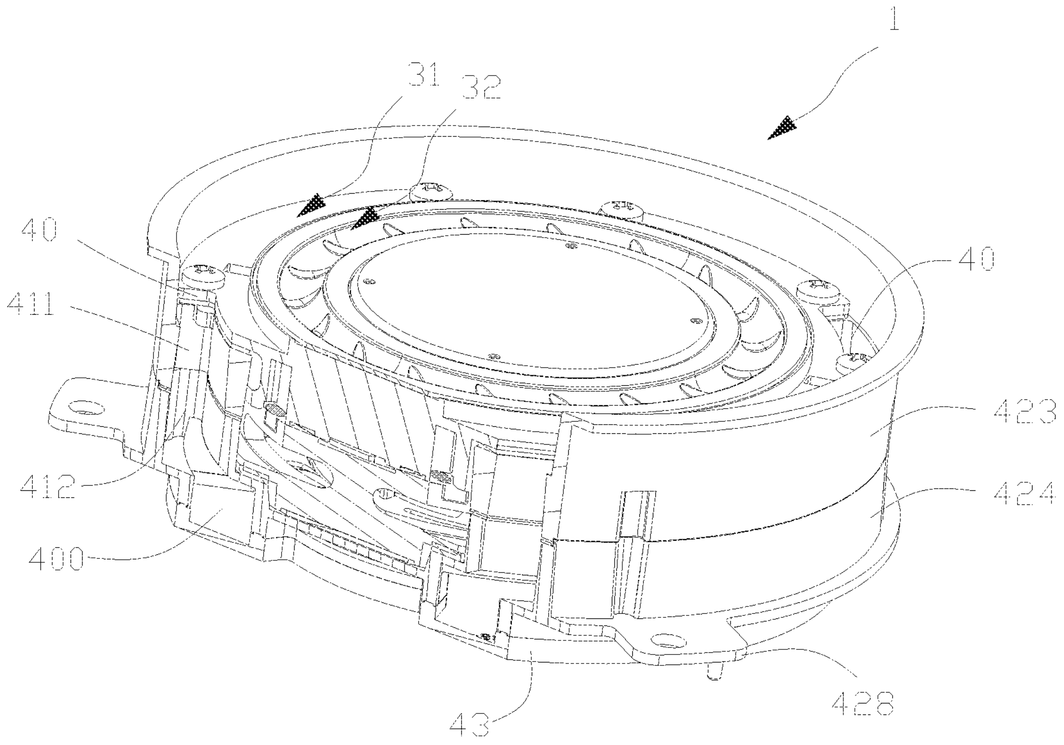
FIG. 2 is a cut-away view of the sounding device in FIG. 1.
Figure 3:
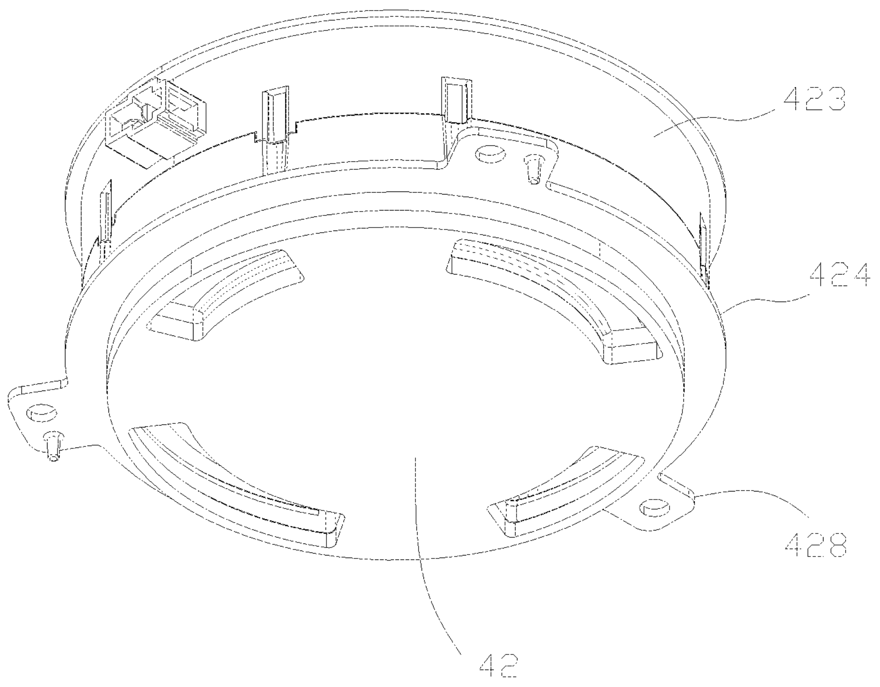
FIG. 3 is an isometric view of the sounding device in FIG. 1, form another aspect.
Figure 4:
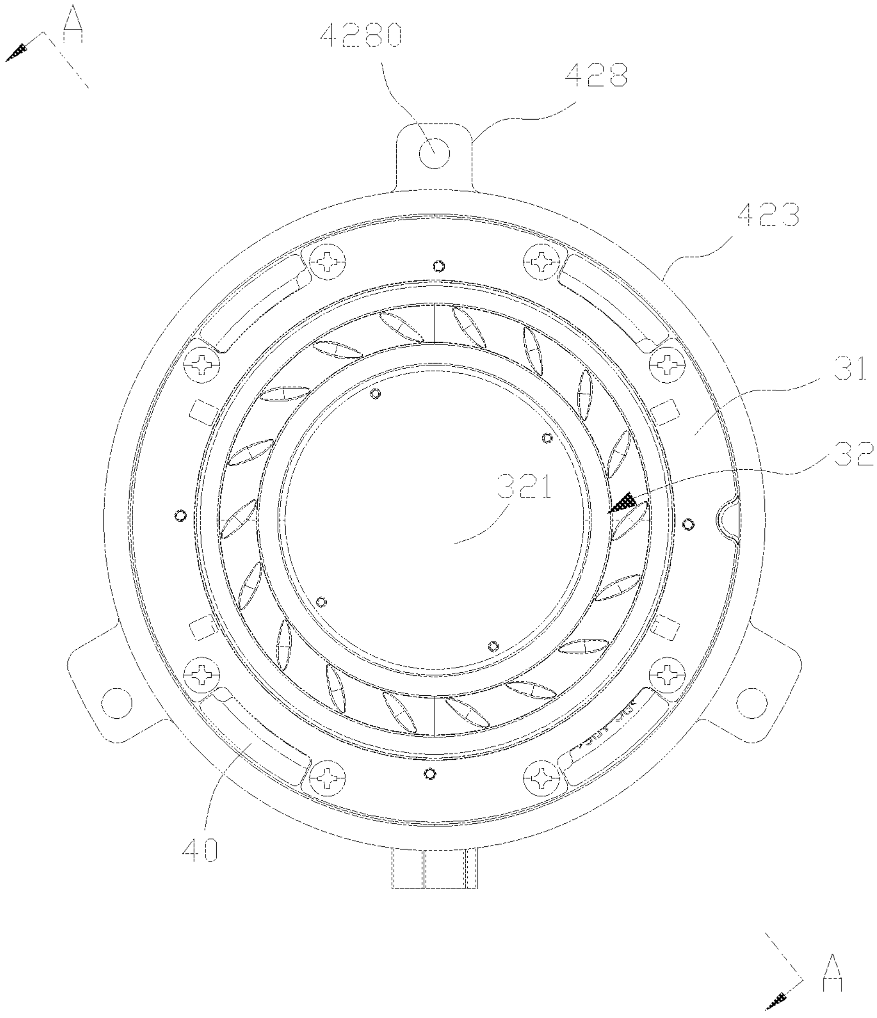
FIG. 4 is a top view of the sounding device in FIG. 1.
Figure 5:
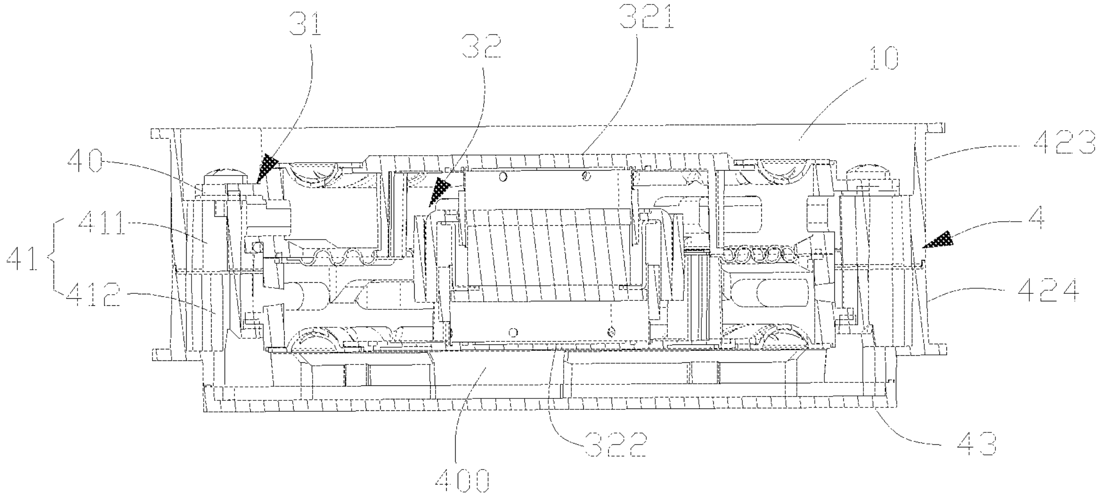
FIG. 5 is a cross-sectional view of the sounding device taken along line A-A in FIG. 4.

According to some specific embodiments of the present application, as shown in FIG. 2 and FIG. 5, the sound guiding channel 41 includes a first sound guiding channel 411 and a second sound guiding channel 412. The side casing 42 includes a first side casing 423 and a second side casing 424.

One end of the first side casing 423 close to the front side 1 is open to form the sound outlet hole 10, and the sound guiding hole 40 is formed between the first side casing 423 and the sounding component 3. The first sound guiding channel 411 is arranged in the first side casing 423, and one end of the first sound guiding channel 411 is communicated with the sound outlet hole 10.

The second side casing 424 is detachably connected to the first side casing 423. The cavity 400 is formed among the bottom cover 43, the second side casing 424 and the end of the sounding component 3 close to the back side 2. The second side casing 424 is provided with a second sound guiding channel 412. One end of the second sound guiding channel 412 is communicated with the first sound guiding channel 411, and the other end of the second sound guiding channel 412 is communicated with the cavity 400.

In this embodiment, the side casing 42 includes a first side casing 423 and a second side casing 424 that are detachably connected, so as to facilitate the disassembly and maintenance of the side casing 42. The first side casing 423 and the second side casing 424 are respectively provided with the first sound guiding channel 411 and a second sound guiding channel 412. One end of the first sound guiding channel 411 is communicated with the sound outlet hole 10. One end of the second sound guiding channel 412 is communicated with the first sound guiding channel. 411 is connected, and the other end of the second sound guiding channel 412 is communicated with the cavity 400. Such a design has a compact structure, so that the sound emitted by the sounding component 3 on the back side of the sounding device firstly enters the cavity 400 formed by the bottom cover 43, the side casing 42 and the end of the sounding component 3 close to the back side 2, and then transmits through the sound guiding channel 41 in the side casing 42, and finally leads out from the sound outlet hole 10.

Specifically, the first sound guiding channel 411 and the second sound guiding channel 412 are respectively arranged in the spaces formed by the inner side of the first side casing 423 and the outer periphery of the sounding component 3, the inner side of the second side casing 424 and the outer periphery of the sounding component 3. The space formed by the inner side of the side casing 42 and the outer periphery of the sounding component 3 is fully utilized, so that the sound emitted by the sounding component 3 on the back side of the sounding device can be directed out of the space. Therefore, the sounding device in this embodiment has a compact structure and a high space utilization rate.

Figure 6:
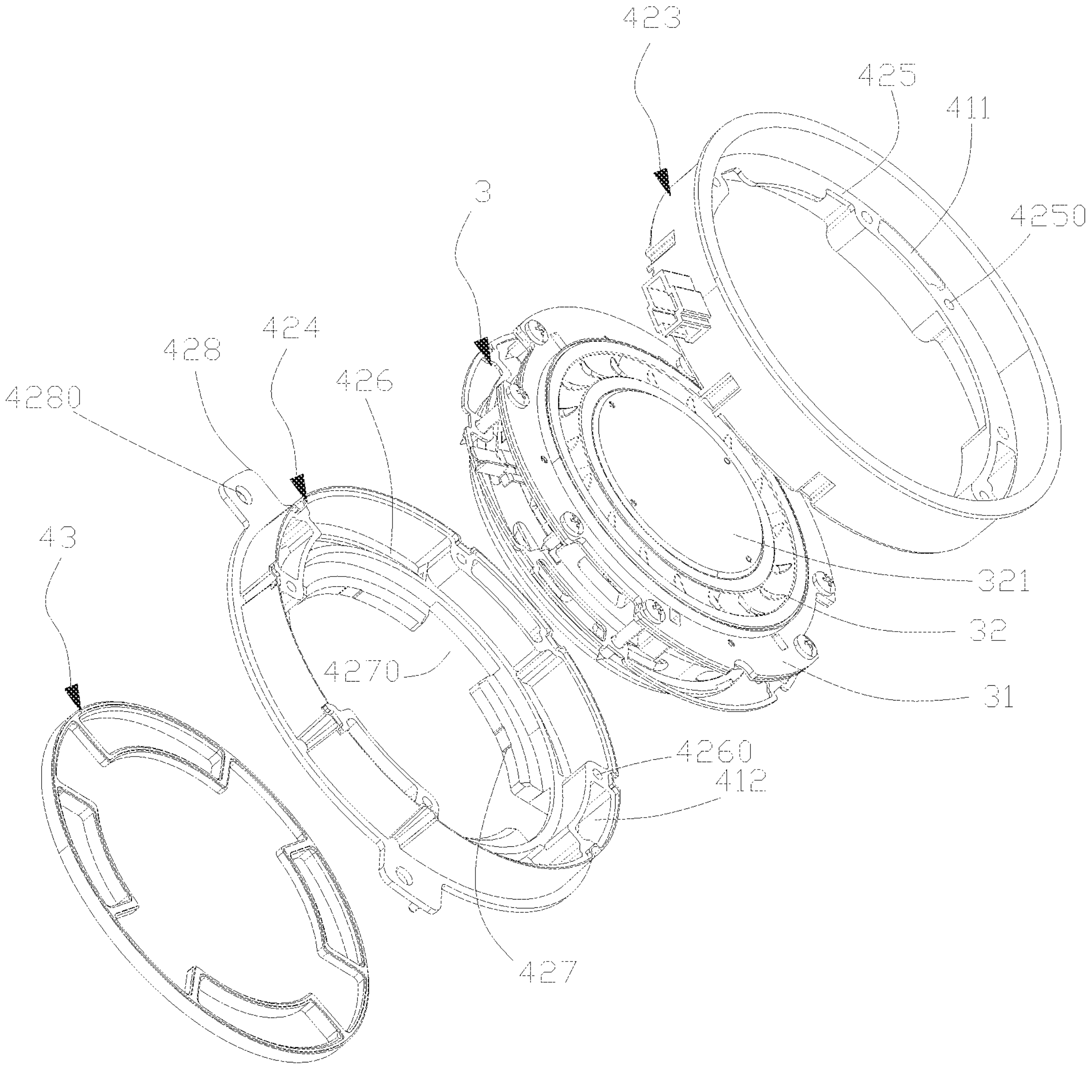
FIG. 6 is an exploded view of the sounding device in FIG. 1.

According to some specific embodiments of the present application, as shown in FIG. 6, a first mounting platform 425 is provided in the first side casing 423, and one end of the sounding component 3 close to the front side 1 is mounted on the first mounting platform 425. The first sound guiding channel 411 is opened on the first mounting platform 425. A first mounting hole 4250 is formed on the first mounting platform 425.

In this embodiment, the first mounting platform 425 is provided in the first side casing 423, and the end of the sounding component 3 close to the front side 1 may be arranged on the first mounting platform 425, so that the end of the sounding component 3 close to the front side 1 can be fixedly connected to the side casing 423. The first sound guiding channel 411 is opened on the first mounting platform 425, and the structure of the first mounting platform 425 is fully utilized to arrange the first sound guiding channel 411, thereby improving a structural utilization rate of the sounding device. The first mounting hole 4250 is opened on the first mounting platform 425, and the end of the sounding component 3 close to the front side 1 can be fastened on the first mounting platform 425 by arranged the bolt component through the first mounting hole 4250. Of course, the fastening and mounting method of the end of the sounding component 3 close to the front side 1 on the first mounting platform 425 is not limited to the bolt connection in this embodiment, which may also be realized by other methods such as snap connection and bonding connection.

According to some specific embodiments of the present application, as shown in FIG. 6, a second mounting platform 426 is provided in the second side casing 424, and the end of the sounding component 3 close to the back side 2 is arranged on the second mounting platform 426. A second sound guiding channel 412 is opened on the second mounting platform 426. A second mounting hole 4260 is opened on the second mounting platform 426.

In this embodiment, the second mounting platform 426 is provided in the second side casing 424, and the end of the sounding component 3 close to the back side 2 may be arranged on the second mounting platform 426, so that the end of the sounding component 3 close to the back side 2 can be fixedly connected to the side casing 424. The second sound guiding channel 412 is provided on the second mounting platform 426, and the structure of the second mounting platform 426 is fully utilized to arrange the second sound guiding channel 412, thereby improving a structural utilization rate of the sounding device. The second mounting hole 4260 is opened on the second mounting platform 426, and the end of the sounding component 3 close to the back side 2 may be fastened on the second mounting platform 426 by arranging the bolt component through the second mounting hole 4260. Of course, the fastening and mounting method of the end of the sounding component 3 close to the back side 2 on the second mounting platform 426 is not limited to the bolt connection in this embodiment, which may also be realized by other methods such as snap connection and bonding connection.

According to some specific embodiments of the present application, as shown in FIG. 6, a plurality of limiting platforms 427 are provided on the inner side of the second mounting platform 426, and one end of the sounding component 3 close to the back side 2 is in contact with the limiting platforms 427. The plurality of limiting platforms 427 are arranged at intervals along a circumferential direction of the second mounting platform 426. There is a gap 4270 between every two adjacent limiting platforms 427, and the gap 4270 is aligned with the second sound guiding channel 412.

In this embodiment, the plurality of limiting platforms 427 are arranged on the inner side of the second mounting platform 426. During mounting, the end of the sounding component 3 close to the back side 2 is in contact with the limiting platforms 427. The limitation of the limiting platforms 427 can prevent the sounding component 3 from being displaced along the axis during use, thereby affecting the sounding effect of the sounding component 3 on the back side. The plurality of limiting platforms 427 are arranged at intervals along the circumferential direction of the second mounting platform 426, and there is a gap 4270 between every two adjacent limiting platforms 427. The design of the gap 4270 enables the sound emitted by the sounding component 3 at the back side to enter the cavity 400, and then enters the gap 4270 accurately, thereby ensuring the directionality of sound transmission and improving the transmission efficiency. Besides, the gap 4270 is aligned with the second sound guiding channel 412, so that the sound from the gap 4270 is accurately guided into the second sound guiding channel. 412, thereby further ensuring the directionality of sound transmission and improving the transmission efficiency.

According to some specific embodiments of the present application, as shown in FIGS. 1-4 and 6, a mounting plate 428 is provided on an outer periphery of the second side casing 424. A third mounting hole 4280 is opened on the mounting plate 428.

In this embodiment, the mounting plate 428 is provided on the outer periphery of the second side casing 424, and the second side casing 424 may be arranged on objects such as the vehicle doors or in-vehicle clothes racks through the mounting plate 428, so as to realize that the whole sounding device is arranged on vehicle doors or the in-vehicle clothes racks. In this embodiment, the third mounting hole 4280 is further provided on the mounting plate 428, and the second side casing 424 may be fixedly arranged on the objects such as the vehicle door or the in-vehicle clothes racks by arranging the bolt component through the third mounting hole 4280.

Specifically, the mounting plate 428 is arranged at one end of the second side casing 424 close to the back side 2 of the sounding device for easy mounting.

According to some specific embodiments of the present application, as shown in FIG. 1 and FIGS. 4-6, the sounding component 3 includes a mounting bracket 31, and the sounding module 32 is arranged in the mounting bracket 31. The mounting bracket 31 is connected to the outer casing 4. The sound guiding hole 40 of the sounding device is formed on the outer casing 4 and at one end of the mounting bracket 31 close to the front side 1.

In this embodiment, the sounding component 3 includes the mounting bracket 31 and a sounding module 32. The sounding module 32 is configured to generate sound. The sounding module 32 is arranged in the mounting bracket 31. The mounting bracket 31 is connected to the outer casing 4. The mounting bracket 31 can realize the connection between the sounding module 32 and the outer casing 4. The sound guiding hole 40 of the sounding device is formed on the outer casing 4 and at one end of the mounting bracket 31 close to the front side 1. Specifically, a gap may be provided on the outer periphery of the end of the mounting bracket 31 close to the front side 1. When the mounting bracket 31 is arranged on the outer casing 4, the outer casing 4 surrounds the gap to form the sound guiding hole 40. The sound guiding hole 40 is arranged by making full use of the structural features, thereby improving the utilization rate of the structure.

Described above are only preferred embodiments of the present application, and are not intended to limit the present application. For those skilled in the art, the present application may have various modifications and changes. Any modification, equivalent replacement and improvement made within the spirit and principle of the present application shall be included within the protection scope of the present application.

What is claimed is:

1. A sounding device, comprising: a front side with a sound outlet hole; a back side; a sounding component comprising a sounding module having a first diaphragm disposed at an end of the sounding module close to the front side, and a second diaphragm disposed at an end of the sounding module close to the back side; an outer casing located outside the sounding component for forming a cavity between the outer casing and the end of the sounding component close to the back side; and a sound guiding channel formed in the outer casing, wherein one end of the sound guiding channel is communicated with the sound outlet hole, and the other end of the sound guiding channel is communicated with the cavity.

2. The sounding device as described in claim 1, further comprising a sound guiding hole formed in the outer casing and at one end of the sounding component close to the front side; the sound guiding hole is aligned with the sound outlet hole, and an end of the sound guiding channel facing away from the cavity is communicated with the sound guiding hole.

3. The sounding device as described in claim 2, wherein the outer casing comprises:

a side casing forming the sound guiding channel along a height direction of the side casing; and a bottom cover covering on one end of the side casing close to the back side for forming the cavity among the bottom cover and the side casing and one end of the sounding component close to the back side.

4. The sounding device as described in claim 3, wherein the sound guiding channel comprises a first sound guiding channel and a second sound guiding channel;

the side casing comprises:

a first side casing, one end of which close to the front side is open to form the sound outlet hole, and the sound guiding hole is formed between the first side casing and the sounding component; the first side casing is provided with a first sound guiding channel, and one end of the first sound guiding channel is communicated with the sound outlet hole; and a second side casing connected to the first side casing, wherein the cavity is formed among the bottom cover, the second side casing and the one end of the sounding component close to the back side; the second side casing is provided with a second sound guiding channel; one end of the second sound guiding channel is communicated with the first sound guiding channel, and the other end of the second sound guiding channel is communicated with the cavity.

5. The sounding device as described in claim 4, wherein the first side casing is provided with a first mounting platform, which is arranged one end of the sounding component close to the front side; the first sound guiding channel is opened on the first mounting platform.

6. The sounding device as described in claim 5, wherein a second mounting platform is provided in the second side casing, and the second mounting platform is arranged one end of the sounding component close to the back side; the second sound guiding channel is opened on the second mounting platform.

7. The sounding device as described in claim 6, wherein a plurality of limiting platforms are provided on an inner side of the second mounting platform, and one end of the sounding component close to the back side is in contact with the plurality of limiting platform; the plurality of the limiting platforms are arranged at intervals along a circumference of the second mounting platform; there is a gap between every two adjacent limiting platforms, and the gap is aligned with the second sound guiding channel.

8. The sounding device as described in claim 4, wherein a mounting plate is provided on an outer periphery of the second side casing, and a third mounting hole is opened on the mounting plate.

9. The sounding device as described in claim 1, wherein the sounding component further comprises:

a mounting bracket connected to the outer casing, wherein a sound guiding hole is formed on the outer casing and at an end of the mounting bracket close to the front side, and the sounding module is arranged in the mounting bracket.

* * * * *